United States Patent
Pasion et al.

(10) Patent No.: US 11,962,698 B2
(45) Date of Patent: Apr. 16, 2024

(54) TOKEN NODE LOCKING WITH FINGERPRINTS AUTHENTICATED BY DIGITAL CERTIFICATES

(71) Applicant: ARRIS Enterprises LLC, Suwanee, GA (US)

(72) Inventors: Jason A. Pasion, San Diego, CA (US); John Okimoto, San Diego, CA (US); Xin Qiu, San Diego, CA (US); Alexander Medvinsky, San Diego, CA (US); Ting Yao, San Diego, CA (US); Jinsong Zheng, San Diego, CA (US); Oscar Jiang, West Covina, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/204,660

(22) Filed: Mar. 17, 2021

(65) Prior Publication Data
US 2021/0297269 A1    Sep. 23, 2021

Related U.S. Application Data

(60) Provisional application No. 62/990,448, filed on Mar. 17, 2020.

(51) Int. Cl.
*H04L 9/32* (2006.01)
*H04L 9/40* (2022.01)

(52) U.S. Cl.
CPC .......... *H04L 9/3213* (2013.01); *H04L 9/3247* (2013.01); *H04L 9/3263* (2013.01);
(Continued)

(58) Field of Classification Search
CPC .................................................... H04L 9/3247
See application file for complete search history.

(56) References Cited

U.S. PATENT DOCUMENTS 8,301,877 B2 * 10/2012 Grajek ................. H04L 9/3268
713/175
8,613,067 B2 * 12/2013 Lambiase ............... G06F 21/41
726/8

(Continued)

FOREIGN PATENT DOCUMENTS

GB      2434724 A      8/2007

OTHER PUBLICATIONS

Naor, M. and Nissim, K., 2000. Certificate revocation and certificate update. IEEE Journal on selected areas in communications, 18(4), pp. 561-570. (Year: 2000).*

(Continued)

*Primary Examiner* — Roderick Tolentino
*Assistant Examiner* — Edward X Long
(74) *Attorney, Agent, or Firm* — Chernoff, Vilhauer, McClung & Stenzel, LLP

(57) ABSTRACT

A system and method for receiving secure data in a client device. In one embodiment, the method comprises (a) receiving a token having a token ID and a digital certificate generated by a certificate authority (CA) having client device fingerprint data generated from client device parameters, (b) accepting a request in the client device to provide secure data to the client device, (c) regenerating the client device fingerprint data from the client device parameters, (d) determining, in the client device, differences between the client device fingerprint data of the digital certificate from the regenerated client device fingerprint data, and (e) transmitting a request to a secure data service to provide secure data based upon the determination.

17 Claims, 16 Drawing Sheets

(52) U.S. Cl.
CPC .......... *H04L 9/3268* (2013.01); *H04L 9/3297* (2013.01); *H04L 63/166* (2013.01); *H04L 2463/121* (2013.01)

(56) References Cited

U.S. PATENT DOCUMENTS

| | | | | |
|---|---|---|---|---|
| 2012/0117351 | A1* | 5/2012 | Motwani | G06F 3/0605 |
| | | | | 711/E12.002 |
| 2015/0019443 | A1* | 1/2015 | Sheets | G06Q 20/322 |
| | | | | 705/71 |
| 2015/0237049 | A1* | 8/2015 | Grajek | H04L 67/02 |
| | | | | 726/7 |
| 2016/0156598 | A1* | 6/2016 | Alonso Cebrian | |
| | | | | H04L 63/0861 |
| | | | | 713/168 |
| 2016/0267284 | A1* | 9/2016 | Willis | H04L 63/08 |
| 2017/0289139 | A1* | 10/2017 | Guo | H04L 63/0876 |

OTHER PUBLICATIONS

Brecht, B., Therriault, D., Weimerskirch, A., Whyte, W., Kumar, V., Hehn, T. and Goudy, R., 2018. A security credential management system for V2X communications. IEEE Transactions on Intelligent Transportation Systems, 19(12), pp. 3850-3871. (Year: 2018).*
International Search Report and Written Opinion Re: Application No. PCT/US2021/022810 (dated Jun. 8, 2021).

* cited by examiner

TOKEN NODE LOCKING WITH FINGERPRINTS AUTHENTICATED BY DIGITAL CERTIFICATES

CROSS-REFERENCE TO RELATED APPLICATIONS

This application claims benefit of U.S. Provisional Patent Application No. 62/990,448, entitled "TOKEN NODE LOCKING," by Jason Pasion et al., filed Mar. 17, 2020, which application is hereby incorporated by reference herein.

This application is related to the following commonly assigned patent application(s), all of which applications are incorporated by reference herein:

Application Ser. No. 17/204,602, entitled "TOKEN NODE LOCKING," filed on same date herewith, by Jason Pasion, John Okimoto, Xin Qiu, Alexander Medvinsky, Ting Yao, Jinsong Zheng, and Oscar Jiang;

Application Ser. No. 17/204,634, entitled "TOKEN NODE LOCKING WITH SIGNED FINGERPRINTS OFFLOADED TO CLIENTS," filed on same date herewith, by Jason Pasion, John Okimoto, Xin Qiu, Alexander Medvinsky, Ting Yao, Jinsong Zheng, and Oscar Jiang.

BACKGROUND

1. Field

The present disclosure relates to systems and methods for providing cryptographic data, and in particular to a system and method for binding processing elements used to request such cryptographic data.

2. Description of the Related Art

It is common for vendors to supply software development kits (SDKs) to clients so that clients can develop and use software on their processing systems. In cases were higher security is required, such SDKs often employ hardware security modules (HSMs) such as USB tokens (eTokens), also provided by the vendor for use by the client. For example, a Public Key Infrastructure (PKI) center produces keys and digital certificates for clients' use. The PKI center issues USB HSM tokens and a software development kit (SDK) to the client so that the client can obtain keys and digital certificates. The client distributes its software and the SDK to its Service Centers (SCs) along with a PKI client station that is used to request secure data such as keys and digital certificates from the PKI Center servers.

In some circumstances, the PKI client stations can be compromised by attackers over the internet using the eTokens from another host (USB over IP). What is needed is a system and method that prevents exploitation of a client's PKI station using the eToken installed on other host (attackers') processors.

SUMMARY

To address the requirements described above, this document discloses a system and method for receiving secure data in a client device. In one embodiment, the method comprises (a) receiving a token having a token ID and a digital certificate generated by a certificate authority (CA) having client device fingerprint data generated from client device parameters, (b) accepting a request in the client device to provide secure data to the client device, (c) regenerating the client device fingerprint data from the client device parameters, (d) determining, in the client device, differences between the client device fingerprint data of the digital certificate from the regenerated client device fingerprint data, and (e) transmitting a request to a secure data service to provide secure data based upon the determination. In one embodiment, transmitting a request to a secure data service to provide secure data based upon the determination comprises: if the client device fingerprint data of the digital certificate matches the regenerated client device fingerprint data, transmitting the request to a secure data service to provide secure data to the secure data service; if the client device fingerprint data of the digital certificate does not match the regenerated client device fingerprint data, determining if differences between the client device fingerprint data of the digital certificate and the regenerated client device fingerprint data are acceptable; and if differences between the client device fingerprint data of the digital certificate and the regenerated client device fingerprint data are acceptable, transmitting the request to a secure data service to provide secure data to the secure data service and receiving the secure data.

Another embodiment is evidenced by an apparatus having a processor and a communicatively coupled memory storing processor instructions for performing the foregoing operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Overview

Disclosed below is a system and method for node locking client stations to tokens to mitigate against the threats described above. Such token node locking binds the eTokens deployed at client service centers to a particular programming station. Once token is bound to a programming station, the eToken can no longer be used on another station unless an authorized person allows it.

Token node locking can mitigate against multiple threats. If a token is stolen and inserted into another station, token node locking will prevent its use in most cases. Also, if a token is used legitimately during business hours at a service center station and taken elsewhere after hours for illegitimate use, token node locking will prevent operation outside the service center.

Token node locking does not prevent authorized token use or movement. For example, if an authorized person obtains a token and uses it legitimately and illegitimately in the same station, token node locking is not itself sufficient to prevent its illegitimate use. Further, if an authorized person intentionally approves movement of a token from a legitimate station to an illegitimate station, token node locking will not prevent its use.

Token Node Locking System Overview

Figure 1:
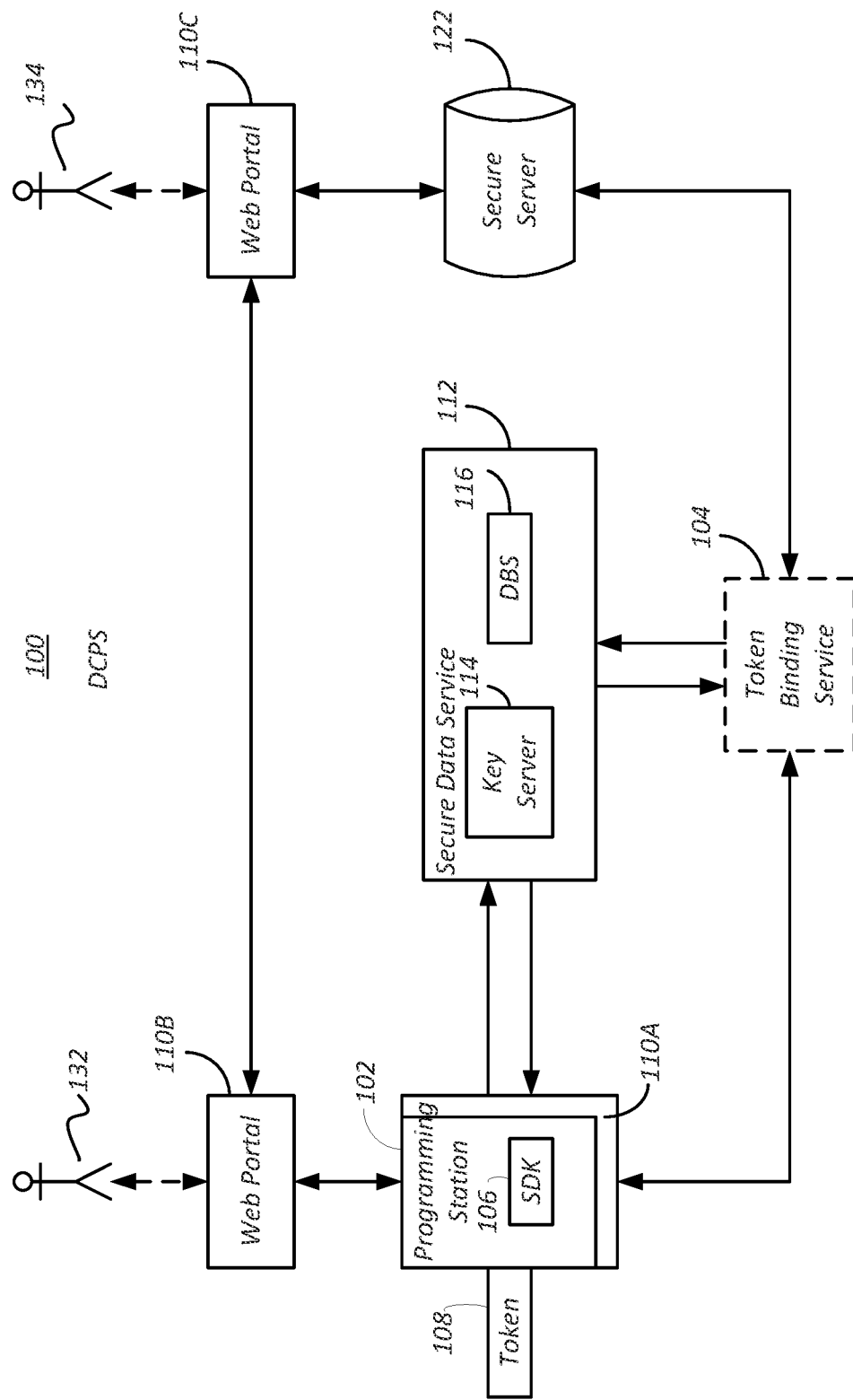
FIG. 1 is a diagram illustrating a Device Credentials Provisioning System (DCPS)

FIG. 1 is a diagram illustrating a Device Credentials Provisioning System (DCPS) 100. The DCPS 100 uses tokens such as hardware tokens 108 communicatively coupled to client devices 102 to lock nodes (e.g. programming stations 102) of the DCPS 100. The DCPS 100 includes a programming station 102 (also alternatively referred to hereinafter as a client device 102) communicatively coupled to a SDS 112, and optionally, a token binding service 104 as further discussed in embodiments below. The SDS 112 comprises a Key Server 114 that provides device credentials, certificate, private key, and other cryptographic data to the client device 102. The Data Block Signing (DBS) service 116 is used to sign submitted device identities (for example, serial numbers) and other information (e.g. lock codes) and provision them into a device at manufacturing time.

Web services or portals 110A-110C provide an interfaces between elements of the DCPS 100 including the client device 102, a secure data service (SDS) 112 which provides the secure data, and a factory administrator 134. Web service 110A between the client device 102 and the token binding service 104 to requests and to receive responses having the SDS. To secure this transaction, the SDK 106 executing on the programming station uses a hardware token 108 communicatively coupled to the client device 102. The token 108 can store objects including public keys, certificates, and other data type objects which are considered public objects. These objects can be viewed and retrieved without logging in to the token 108 (e.g. a token password is not required). The token 108 also stores a private key and optionally, a secret key, which are sensitive. Such object types can only be viewed and used upon entry of the proper token password. The token password is also required to modify any object stored in the token 108. Token identifying information (such as a serial number or digital certificate) can be provided to the token binding service 104 via the SDK 106 and the web service 110.

Token Node Locking System

Figure 2:
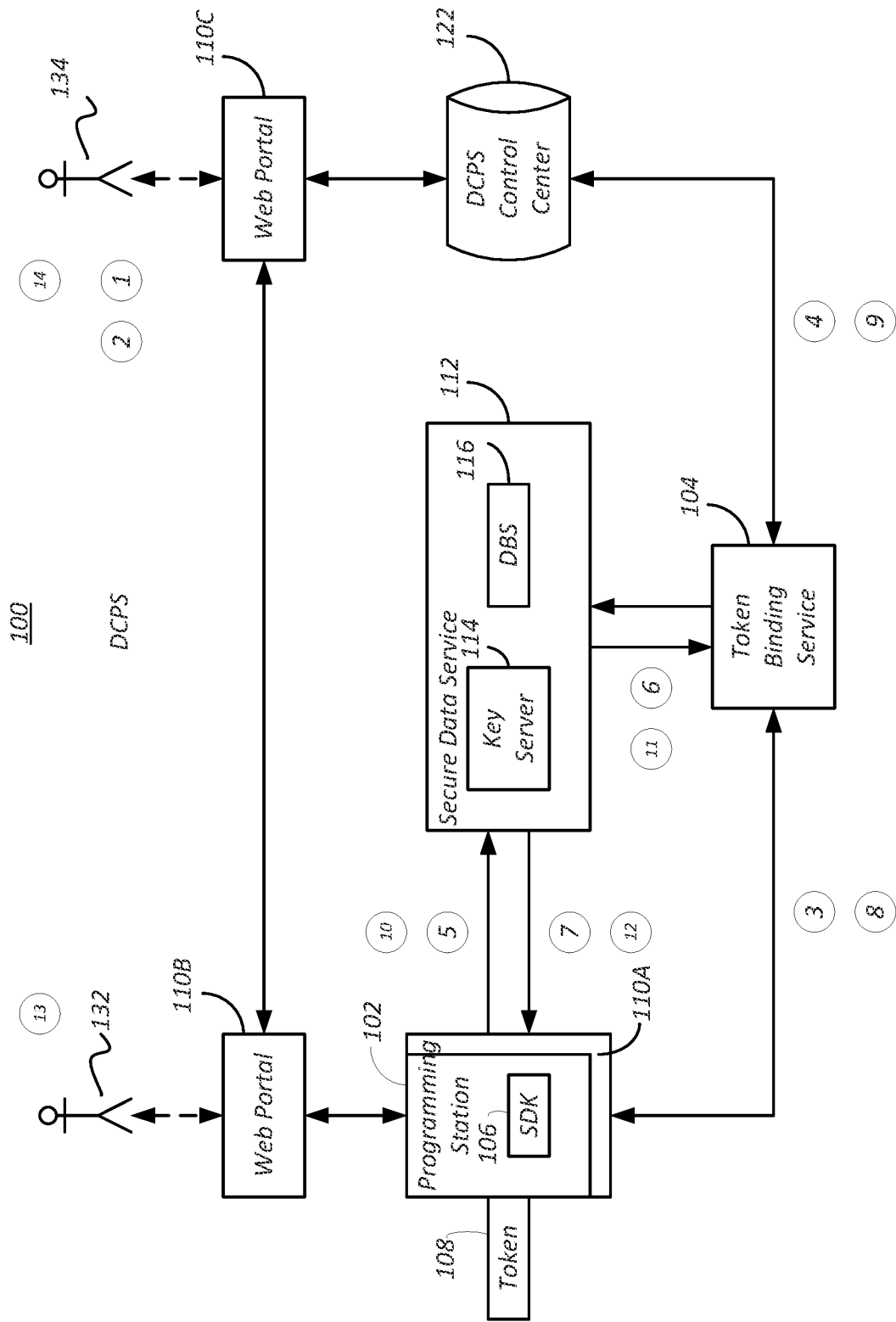
FIG. 2 is a diagram of a first embodiment of one embodiment of a token node locking system and method for using same.
Figure 3A:
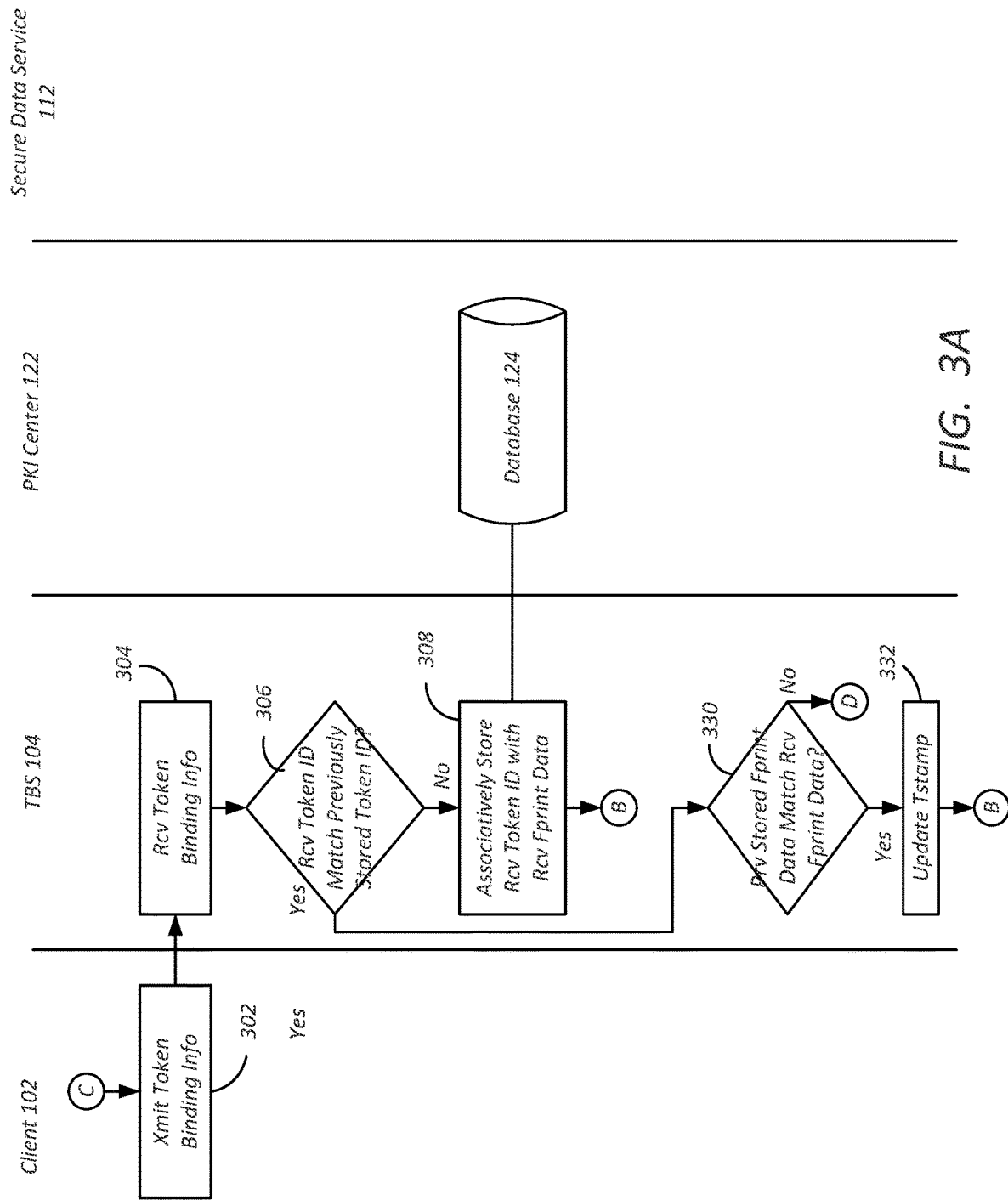
FIG. 3A-3C are diagrams presenting further details of one embodiment of operations used to establish and enforce node locking depicted in FIG. 2.
Figure 3B:
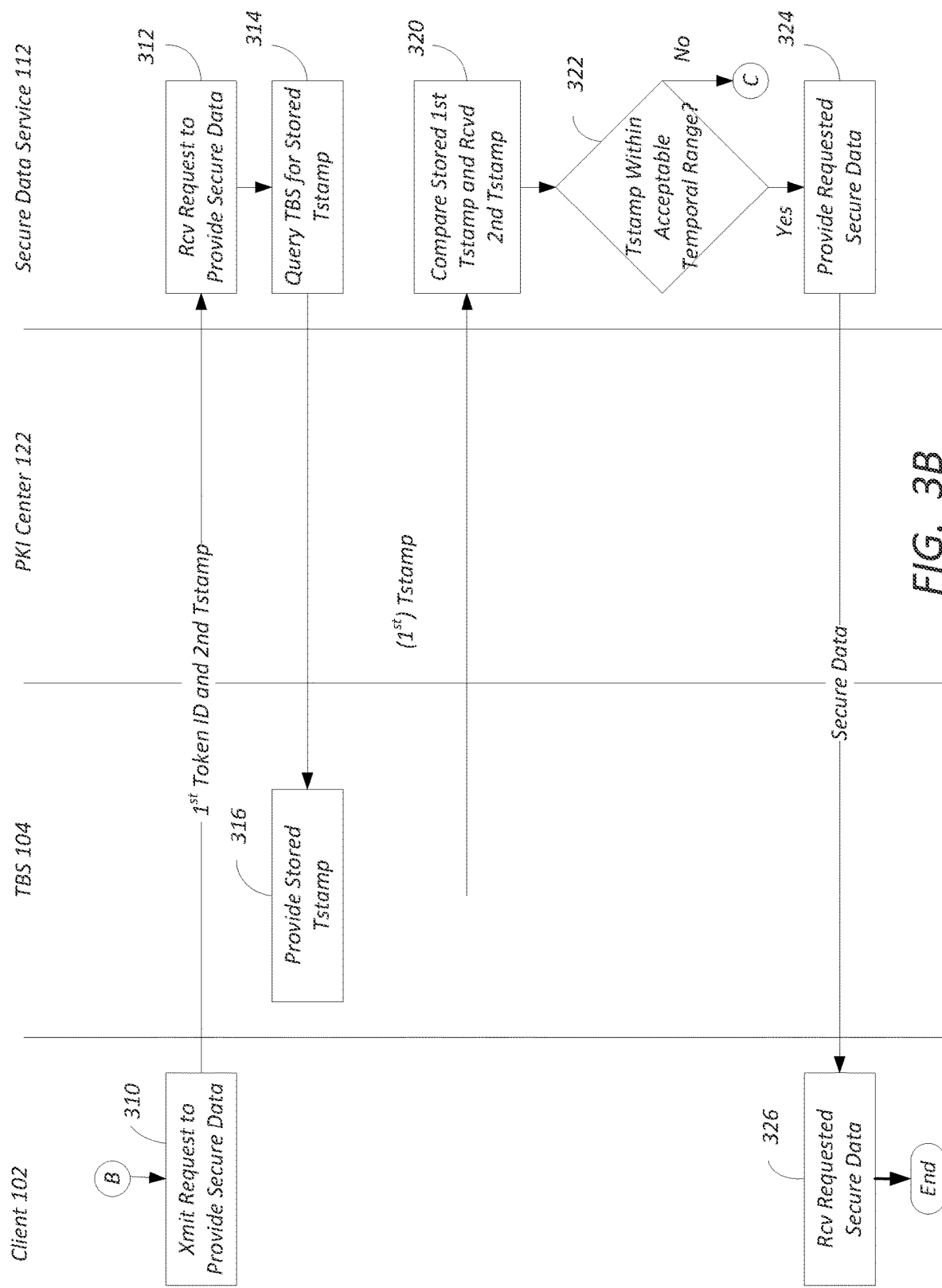
Figure 3C:
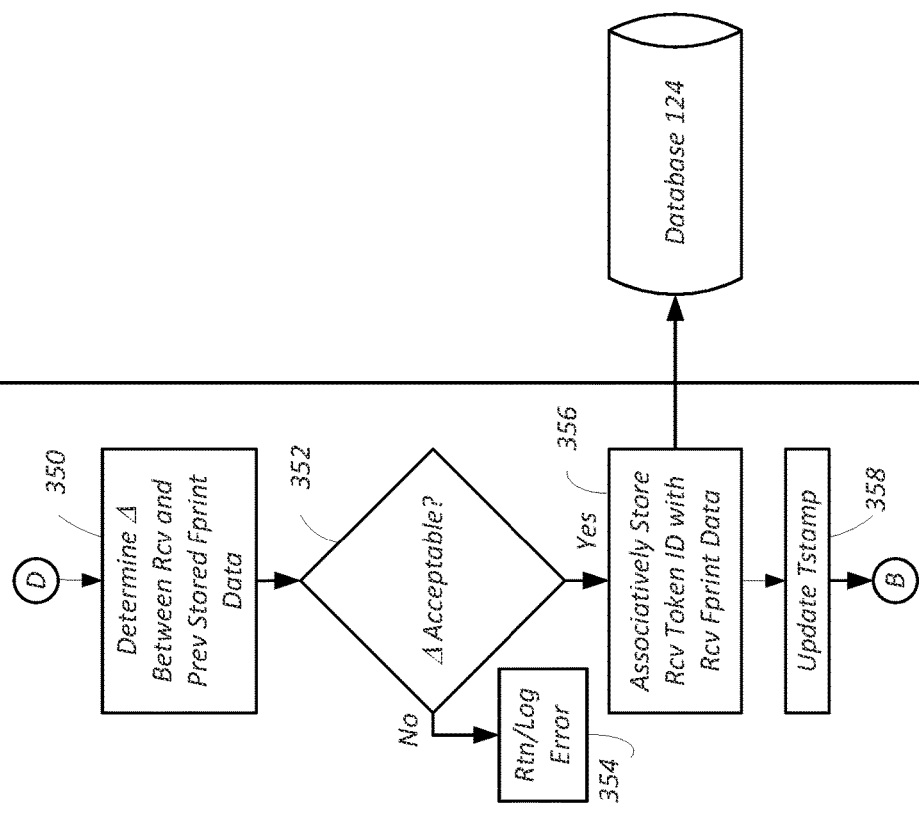

FIG. 2 is a diagram of a first embodiment of one embodiment of a token node locking system and method for using same. FIGS. 3A-3C are diagrams presenting further details of one embodiment of operations used to establish and enforce node locking depicted in FIG. 2. FIG. 2 is annotated with numbers indicating a sequence of performed operations which are more fully described in FIGS. 3A-3C below. In steps 1 and 2, a manager or factory administrator 134 of the DCPS 100 deploys or updates the TBS 104 and SDS 112. The factory administrator 134 also deploys the SDK 106 and token 108 to the client, and the client deploys the SDK 106 and token 108 to the client device 102.

The first token binding information is generated by the client device 102 using the SDK 106. In one embodiment, the first token binding information includes a token identifier (ID), such as a digital certificate or serial number, and first client device fingerprint data derived from client device 102 parameters. The client device 102 gathers the token ID and fingerprint parameter values, and generates the fingerprint data from the parameter values.

Programming Station Fingerprint Parameters

The client device parameters can be any parameter of the client device that can be used to uniquely identify the client device, and may include one or more of the following, with exemplary values for the respective client parameter. Client device fingerprint data can be a combination (e.g. concatenation) of the client device parameter values, including various software and hardware version numbers, serial numbers and other identifiers present in a general-purpose computer.

In step 3 the client device 102 transmits first token binding information to the TBS 104. This is also illustrated in block 302 of FIG. 3A. the first token binding information includes the a first token ID and first fingerprint data. In one embodiment, the first token binding information is transmitted from the client device 102 to the TBS 104 via a secure two-way transport layer security (TIS) session. In block 304, the TBS 104 receives the (first) token binding information. A timestamp indicating when the token binding information was transmitted may be included in the transmission from the client to the TBS 104, or the TBS may timestamp the message having the token binding information when received.

In step 4 and block 306, the TBS 104 determines whether the received (first) token ID in the received (first) token binding information matches a previously received and stored token ID. If it does not match, the received (first) token ID is apparently new, and the TBS associatively stores the received (first) token ID with the received (first) fingerprint data in database 124 such as in storage of the a DCPS Control Center 122, as shown in block 306 and 308.

In step 5, the client device 102 transmits a request to provide secure data to the SDS 112. This is also shown in block 310 of FIG. 3B. The request includes the first token ID. In one embodiment, the request also includes a second timestamp reflecting the current time. In other embodiments, the second timestamp is determined by the SDS 112 when it receives the request. In blocks 312 and 314, the SDS 112 receives the request to provide the secure data, and queries the TBS 104 for the stored (first) timestamp associated with the transmitted token ID, as shown in step 6. The TBS 104 provides the stored (first) timestamp, as shown in block 316.

In block 320, the SDS 112 compares the stored (first) timestamp and the received (second) timestamp to determine if they are within an acceptable temporal range, indicating that the request to receive the data is not stale when compared to the provision of the token binding information. Based on this determination, the requested secure data is provided, or further processing is required. For example, if the stored (first) timestamp and the received (second) timestamp are within an acceptable temporal range, the requested secure data is provided to the client device 102, as shown in blocks 322, 324, and 326 and step 7. If the first timestamp and the second timestamp are not within the acceptable temporal range, processing is routed back to block 302 of FIG. 3A. The SDS sends an error/response message back to client to let client restart the block 302 process to resend further token binding information. As illustrated in step 8, block 302 transmits further (second) token binding information to the TBS 104. Again, the SDK 106 gathers the client device parameters and uses these parameters to regenerate fingerprint data of the client device, and sends the token ID and fingerprint data to the TBS 104, along with a second timestamp. To distinguish this regenerated token binding information from that which was previously generated and transmitted to the TBS 104, this regenerated token binding information is alternatively hereinafter referred to as second token binding information (including the second token ID and second fingerprint data). If the same token 108 is used with the same and unchanged client device 102 to generate the token binding information, the first and second token binding information should be identical. Changes in the token binding information indicate that either the token 108 or the client device 102 has changed, as described below.

Referring back to block 304, the TBS 104 receives the second token binding information. If the second timestamp was not received with the second token binding information, the TBS 104 generates a second timestamp, representing when the second token binding information was received. Again, this information may be sent in a two-way TLS session.

Referring now to step 9, In block 306, it is determined if the second token ID matches a previously stored token ID. If the second token ID does not match a previously stored ID, this indicates that the token has not been registered, and the token binding information (including the second token ID, the second fingerprint data, and the second timestamp) are associatively stored in the database, as shown in block 308. If the second token ID matches a previously stored token ID (in our example, the first token ID), this is an indication that the token is a previously registered token, and processing is routed to block 330 to check whether the fingerprint data associated with the previously stored token ID matches the fingerprint data associated with the second token ID that was recently received.

If the fingerprints match, this is an indication that the token 108 has not been moved from the client device 102 it was originally bound to, and moved to another client device 102. Accordingly, processing is routed to block 332, and the stored timestamp associated with the second token ID (which, since it matched the first token ID, is also associated with the first token ID) is updated to the most recently received (second) timestamp. As shown in step 10, processing is then routed to block 310, at which time, the client device 102 transmits a further request to provide secure data. As before, this request includes the token ID and a further (current) timestamp, and if the temporal difference between the stored second timestamp and the further (current) timestamp is within an acceptable temporal range, the requested secure data is provided, as shown in blocks 312-326 and steps 11 and 12.

If the fingerprints do not match, this may be an indication that the client device has changed in a permissible way (e.g. had a new video card installed), has been changed in an impermissible way (e.g. multiple hardware and software components were replaced at the same time to make it look like a new client device 102), or has been moved to another client device 102. Processing is routed to block 350, in which the difference between the first fingerprint data and the second fingerprint data is determined. Block 352 determines if the differences are acceptable. If the differences are acceptable, the new second fingerprint information is associatively stored with the second token ID and the second timestamp, as shown in block 356, and the timestamp is updated, as shown in block 358. Thereafter, processing is routed to block 310 at which time, the client device 102 transmits a further request to provide secure data. As before, this request includes the token ID and a further (current) timestamp, and if the temporal difference between the stored second timestamp and the further (current) timestamp is within an acceptable temporal range, the requested secure data is provided, as shown in blocks 312-326 and steps 11 and 12.

If the differences between the first fingerprint data and the second fingerprint data are not acceptable, block 353 routes processing to block 354. Block 354 comprises error processing which may include any one or more of (1) returning an error message to the client device 102, (2) logging a failed attempt or error, and (3) transmitting an error message or a logged failed attempt to the client device administrator 132 or factory administrator 134.

Acceptable differences between the first fingerprint data and the second fingerprint data can be defined in a variety of ways to suit each application. In one embodiment, whether the differences between the first fingerprint data and the second fingerprint data is acceptable is determined by the number of client device parameters that have changed compared to the total number of parameters (e.g. K of N). For example, suppose the first client device fingerprint data includes N=four parameters: (1) the MAC address (2) the CPU ID, the (3) BIOS serial number, and (4) the hard drive signature, it may be determined that an acceptable change is any K of the foregoing parameters having changed, but with more than K such parameters deemed excessive. Another criteria for acceptable changes in the fingerprint data is the total number of changes. This assessment as to the number of changes can be made over the time period between temporally adjacent timestamps, or over any desired time period. For example, suppose the hard drive signature for the same token ID changes between the first fingerprint data and the second fingerprint data. While this change may be deemed acceptable (e.g. a hard drive was changed on the client device 102), a further change to a third hard drive signature or a change back to the initial hard drive signature evidences an unacceptable number of changes over the specified period of time (either evaluated for the same parameter or a different client device parameter). In still another embodiment, the first client device fingerprint data is compared to other client device fingerprint data in the database to determine if the first client device fingerprint data matches other client device fingerprint data that is associated with a different token (as determined by the token ID). This is an indication that another token is being used with the client device 102. Further, if a particular token ID is associated with first client device fingerprint data, is later associated with second device fingerprint data, and still later associated with the first client device fingerprint data, this "fingerprint flipping" is an indication that the token 108 is being shared among a plurality of device, and this change can be considered to be unacceptable. Finally, a history of the token binding information received for a particular token ID can be generated and transmitted to administrator 132.

It is noted that if the client device administrator 132 wishes to move the token to another client device 102, this can be accomplished by transmitting a request from the client device administrator 132 to the factory administrator 134. to unbind the token from the client device by disassociating the client device fingerprint data from the associated token ID. The token 108 can then be bound to another client device 102 using the steps 3 and 4 described above.

Token Node Locking with Signed Fingerprints Offloaded to Clients

Figure 4:
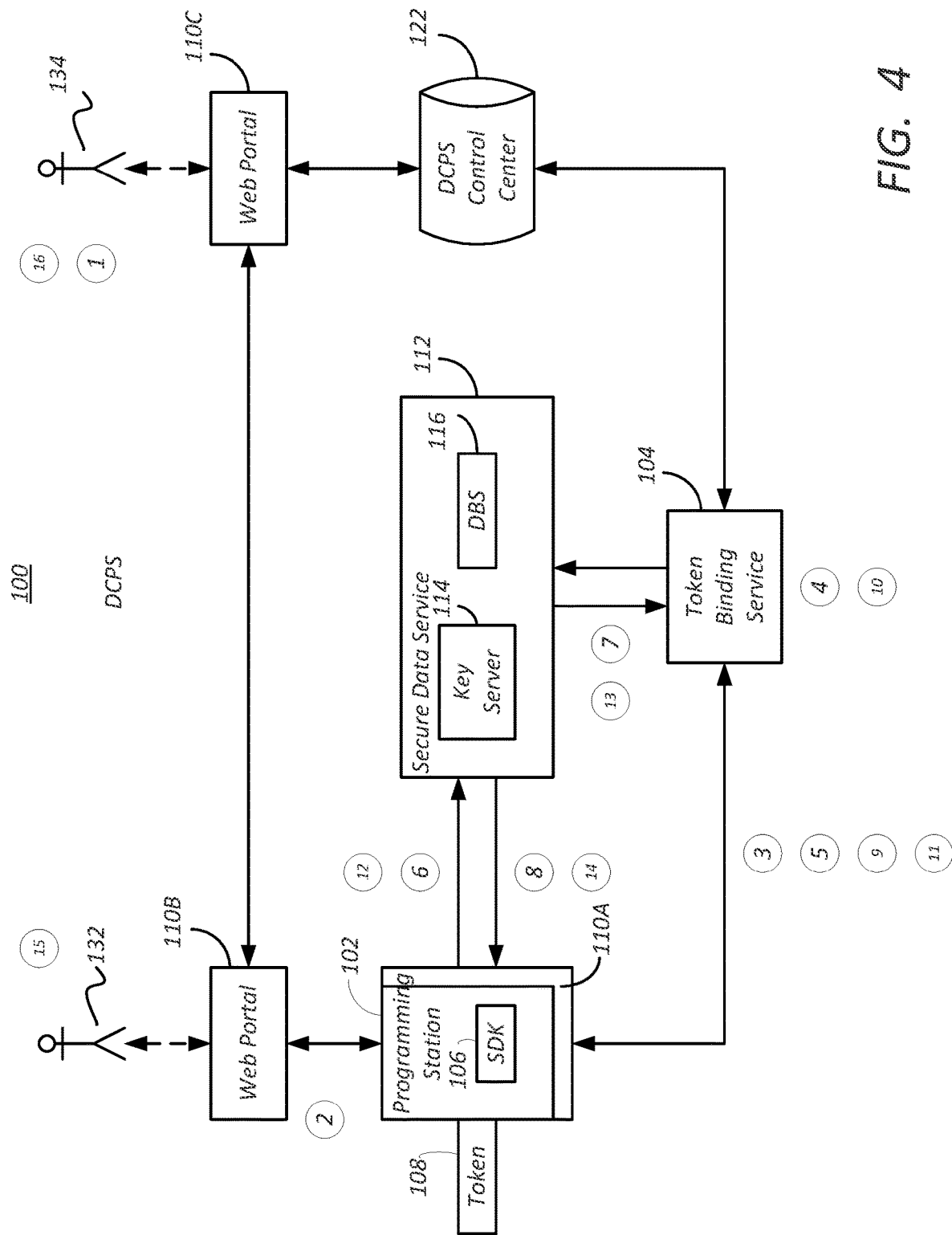
FIG. 4 is a diagram of another embodiment of one embodiment of a token node locking system and method for using same.

In an alternative embodiment, the token binding service returns binary data including a signed timestamp back to the client device 102. When the client device 102 requires secure data, the client device 102 then passes the signed timestamp to the SDS 112, and upon verification of the signed timestamp, the secure data is provided. FIG. 4 is a diagram of another embodiment of a token node locking system and method for using same. FIG. 5A-5E are diagrams presenting further details of the embodiment of operations used to establish and enforce node locking depicted in FIG. 4. FIG. 4 is annotated with numbers indicating a sequence of performed operations which are more fully described in FIGS. 5A-5D below. In step 1 and 2, factory administrator 134 deploys or updates the TBS 104. In step 2, the factory administrator 134 also deploys the SDK 106 and token 108 to the client, and the client deploys the SDK 106 and token 108 to the client device 102. Token binding information is generated by the client device 102 using the SDK 106. In one embodiment, the first token binding information includes a token identifier (ID), such as a digital certificate or serial number, and first client device fingerprint data derived from client device 102 parameters. The client device 102 gathers the token ID and fingerprint parameter values, and generates the fingerprint data from the parameter values as described above.

In step 3 the client device 102 transmits (first) token binding information to the TBS 104. This is also illustrated in block 302 of FIG. 3A. In one embodiment, the (first) token binding information is transmitted from the client device 102 to the TBS 104 via a two-way transport layer security (TLS) session. In block 304, the TBS 104 receives the (first) token binding information. A timestamp indicating when the token binding information was transmitted may be included in the transmission from the client to the TBS 104, or the TBS may timestamp the message having the token binding information when received.

In step 4 and block 306, the TBS 104 determines whether the received (first) token ID in the received (first) token binding information matches a previously received and stored token ID, as shown in block 506. If it does not match, the received (first) token ID is apparently new, and the TLS signs the received token binding information, as shown in block 508 and associatively stores the signed token binding information and timestamp in database 124. The TBS 104 then returns the signed token binding information and timestamp to the client, as shown in blocks 512 and 514 and in step 5. Processing is then routed to block 520, in which the client device 102 transmits a message to the SDS 112 to request the provision of secure data to the client device 102 as shown in step 6. In one embodiment, the request comprises the signed (first) token binding information, which includes the first token ID and the first timestamp.

In block 522, the SDS 112 receives the request. The request includes the signed (first) token binding information and timestamp. In one embodiment, the request also includes a second timestamp reflecting the current time. In other embodiments, the second timestamp is determined by the SDS 112 when it receives the request.

In step 7 and block 524, the SDS 112 verifies the signature of the signed first token binding information and timestamp. If the signature cannot be verified, error processing is invoked as shown in block 526. Such error processing may include returning an error to the client device 102, logging an error to the database 124, or informing the factory administrator 134 of the error. Further, logged errors can be compiled into a token report, and provided to the client device administrator 132 of the client device 102. If the signature is verified, processing is routed to block 528, which compares first timestamp (included in the request to provide secure data) and the second timestamp (a current timestamp either included in the request to provide secure data or generated by the SDS 112 when the request is received).

If the timestamps are within an acceptable temporal range, block 530 routes processing to blocks 532 and 534, in which the requested secure data is provided to the client device 102. This is shown in step 8 of FIG. 4.

Figure 5A:
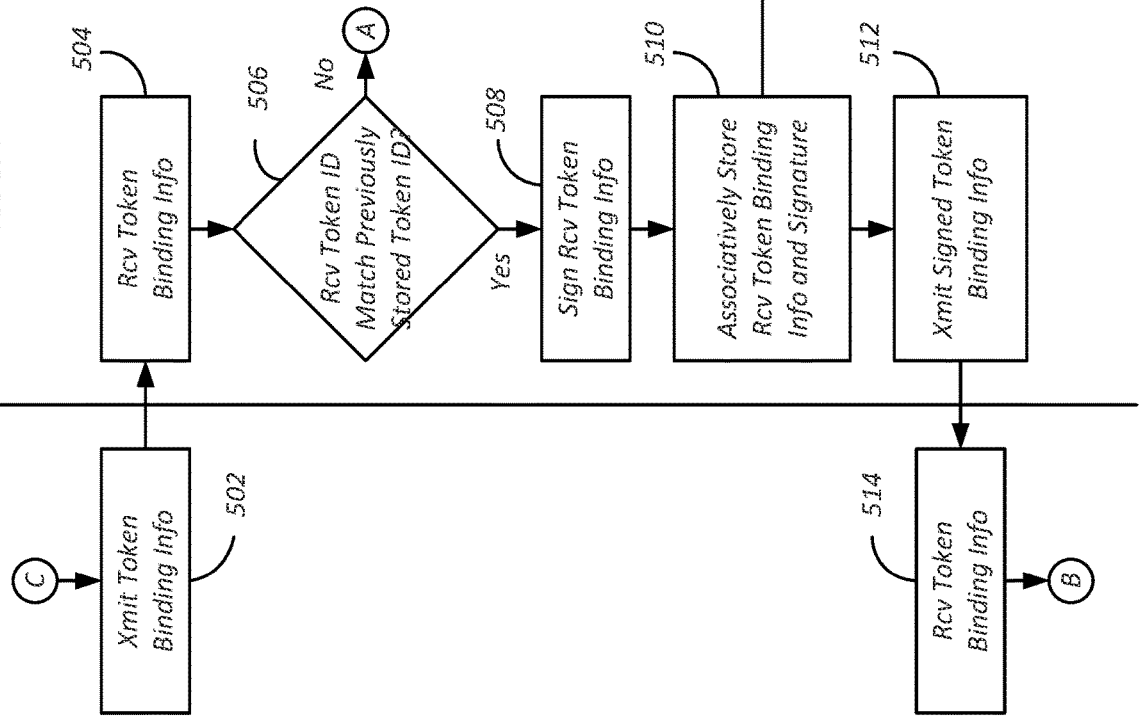
FIG. 5A-5E are diagrams presenting further details of the embodiment of operations used to establish and enforce node locking depicted in FIG. 4.
Figure 5B:
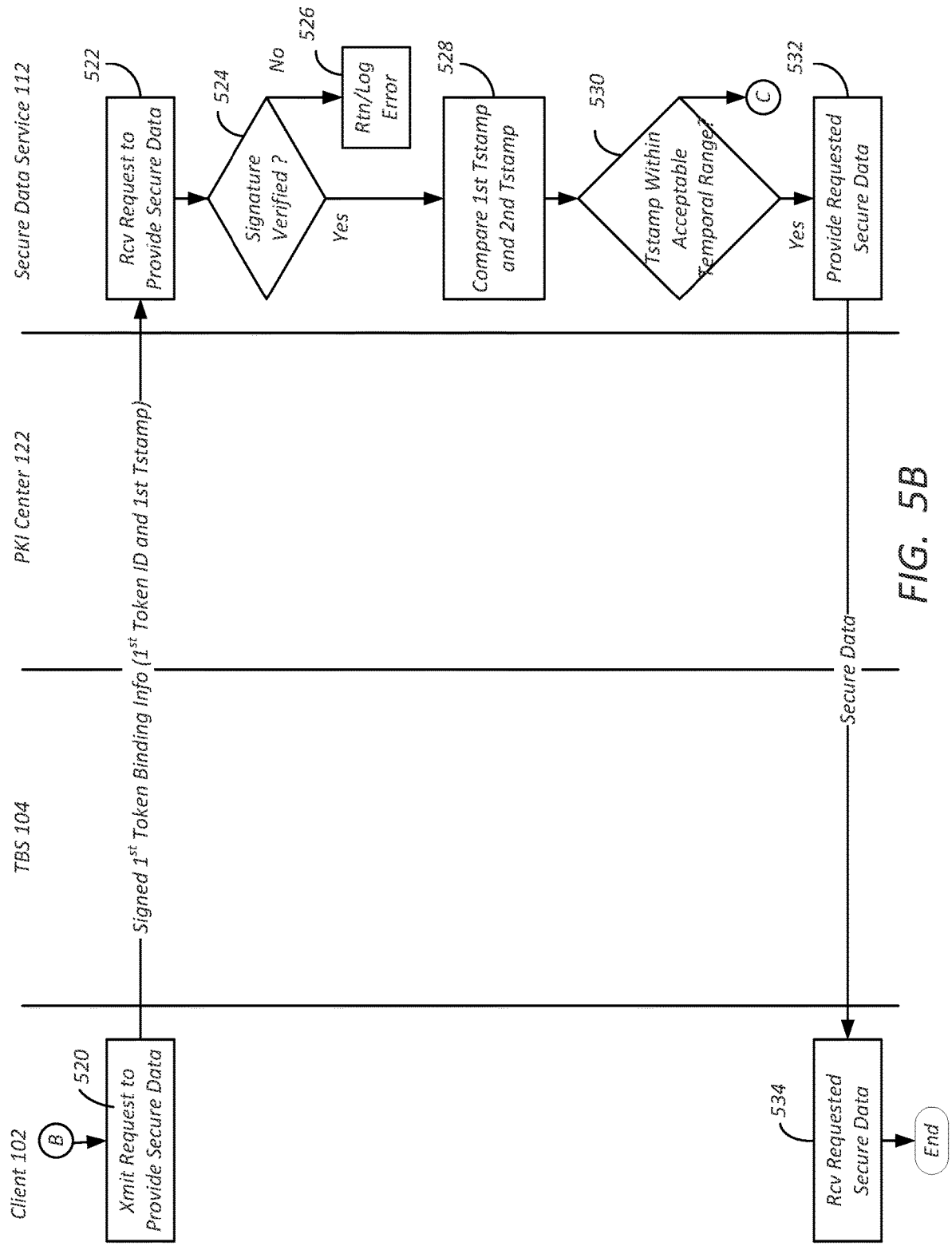
Figure 5C:
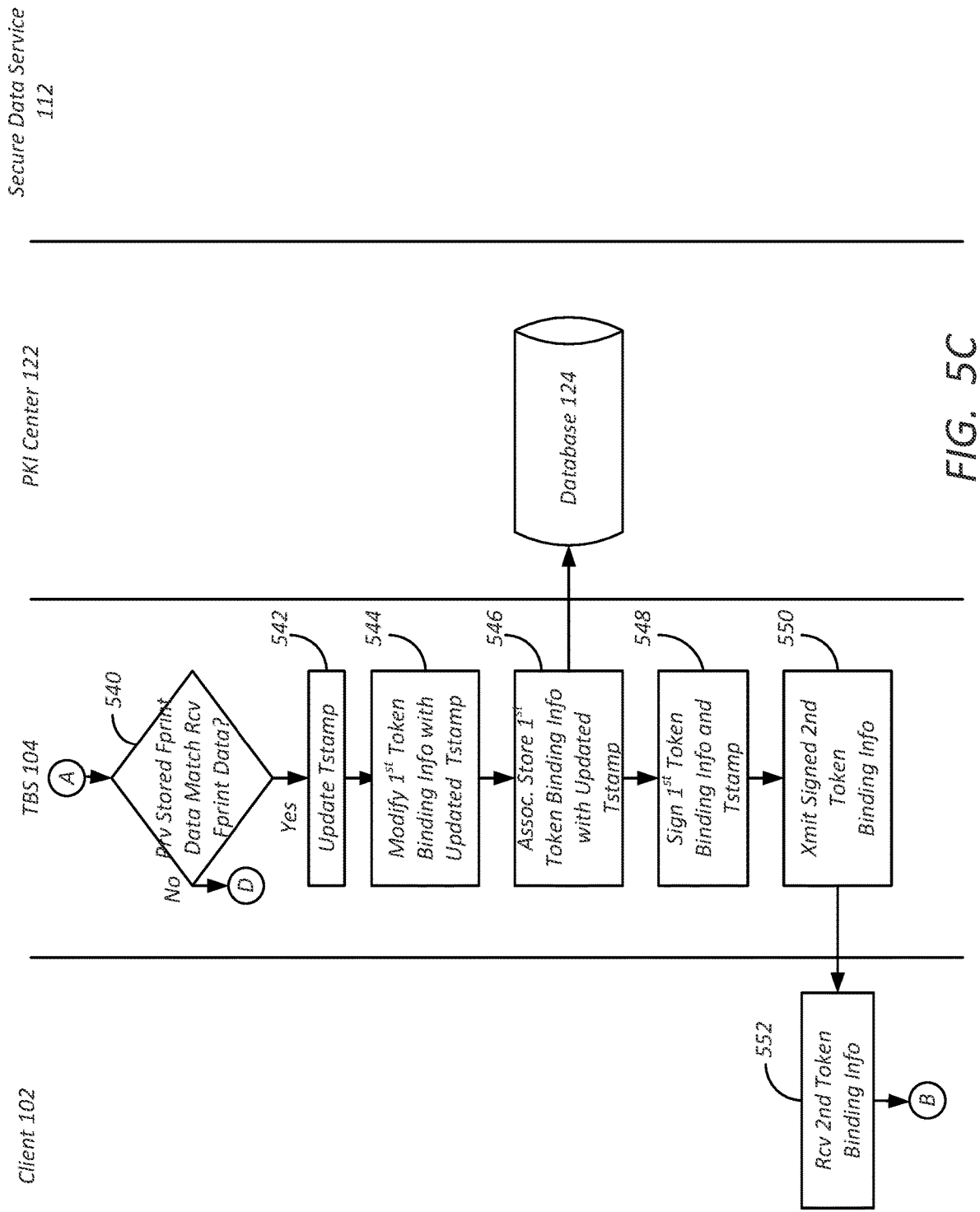
Figure 5D:
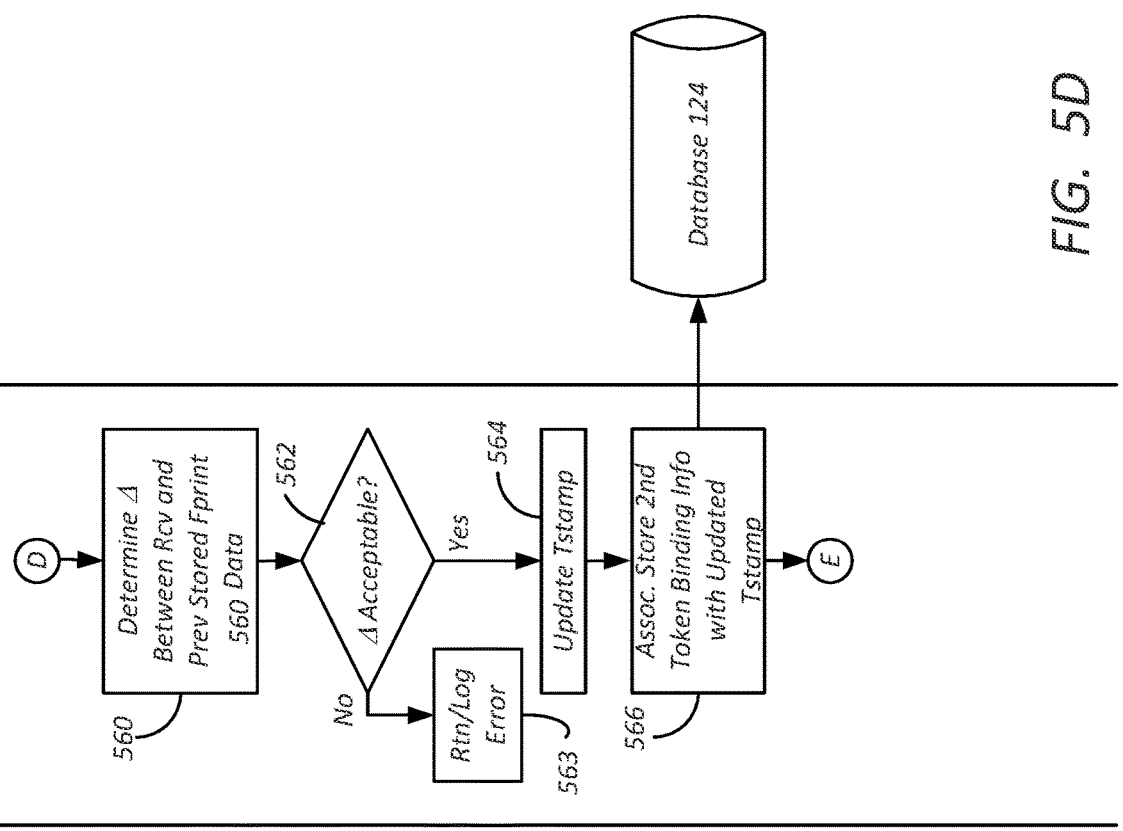
Figure 5E:
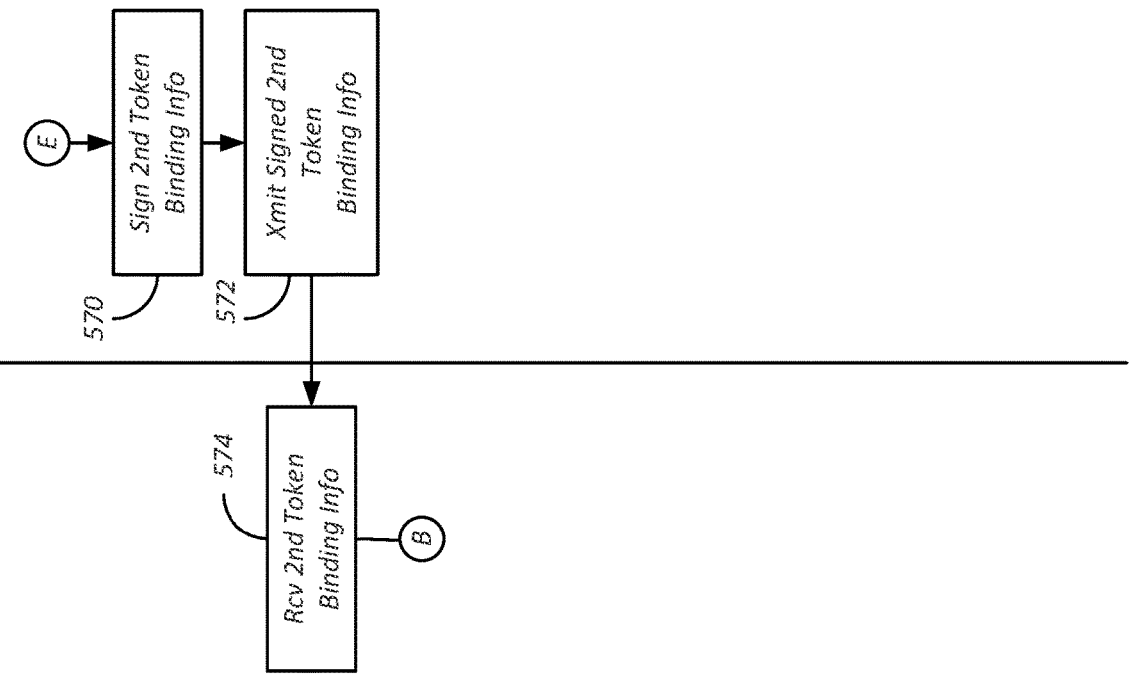

If the first timestamp and the second timestamp are not within the acceptable temporal range, processing is routed back to block 502 of FIG. 5A. Again, the SDS sends an error/response message back to client to let client restart the block 302 process to resend further token binding information to the TBS 104.

Again, the SDK 106 gathers the client device parameters and uses these parameters to generate fingerprint data of the client device, and sends the token ID and fingerprint data to the TBS 104, along with a second timestamp, as shown in step 9. To distinguish this regenerated token binding information from that which was previously generated and transmitted to the TBS 104, this regenerated token binding information is alternatively hereinafter referred to as second token binding information. If the same token 108 is used with the same and unchanged client device 102 to generate the token binding information, the first and second token binding information should be identical. Changes in the token binding information indicate that either the token 108 or the client device 102 has changed, as described below.

Referring back to block 504, the TBS 104 receives the second token binding information. If the second timestamp was not received with the second token binding information, the TBS 104 generates a second timestamp, representing when the second token binding information was received. Again, this information may be sent in a two-way TIS session.

Referring now to step 10, In block 506, it is determined if the second token ID matches a previously stored token ID. If the second token ID does not match a previously stored ID, this indicates that the token has not been registered, and the processing of blocks 508-514 are performed as described above. If the second token ID matches a previously stored token ID (in our example, the first token ID), this is an indication that the token is a previously registered token, and processing is routed to block 540 to check whether the fingerprint data associated with the previously stored token ID matches the fingerprint data associated with the second token ID that was recently received.

If the fingerprints match, this is an indication that the token 108 has not been moved from the client device 102 it was originally bound to, and moved to another client device 102. Accordingly, processing is routed to blocks 542-552, and the stored timestamp associated with the second token ID (which, since it matched the first token ID, is also associated with the first token ID) is updated to the most recently received (second) timestamp. Processing is then routed to block 544, in which the first token binding information is modified (updated) by substituting the second time stamp for the first timestamp in the first token binding information. Block 546 associatively stores the first token binding information in the database 124, and block 548 signs the first token binding information and timestamp. The signed first token binding information and timestamp are then transmitted to the client, where they are received, as shown in blocks 550 and 552 and step 11. Thereafter, processing returns to block 520, at which time, the client device 102 transmits a further request to provide secure data, as shown in step 12. As before, this request includes the signed token binding information and a further (current) timestamp, and if the temporal difference between the stored second timestamp and if the signature is verified and the further (current) timestamp is within an acceptable temporal range, the requested secure data is provided, as shown in blocks 524-534 and steps 13 and 14.

If the fingerprints do not match, this may be an indication that the client device has changed in a permissible way (e.g. had a new video card installed) has been changed in an impermissible way (e.g. multiple hardware and software components were replaced at the same time to make it look like a new client device 102), or has been moved to another client device 102. Processing is routed to block 560, in which the difference between the first fingerprint data and the second fingerprint data is determined. Block 562 determines if the differences are acceptable. If the differences are acceptable, the timestamp is updated to the current timestamp as shown in block 564, and second token binding information with the updated timestamp is associatively stored in the database 124, as illustrated in block 566. Then, as shown in block 570, the second token binding information (including the second token ID, second token fingerprint information and the current timestamp) is signed and transmitted to the client device 102, as shown in blocks 570-574. Processing is then routed to block 520.

If the differences between the first fingerprint data and the second fingerprint data are not acceptable, block 562 routes processing to block 563. Block 563 comprises error processing which may include any one or more of (1) returning an error message to the client device 102, (2) logging a failed attempt, and (3) transmitting an error message or a logged failed attempt to the client device administrator 132 or Factory Administrator 134.

Acceptable differences between the first fingerprint data and the second fingerprint data can be defined in a variety of ways to suit each application, as described above.

As before, it is noted that if the client device administrator 132 wishes to move the token to another client device 102, this can be accomplished by transmitting a request from the client device administrator 132 to the factory administrator 134, to unbind the token from the client device by disassociating the client device fingerprint data from the associated token ID as shown in step 15. The token 108 can then be bound to another client device 102 and another certificate obtained as described in steps 3-5 above, as illustrated in step 16.

Token Node Locking with Fingerprints Authenticated by Digital Certificates

In this embodiment, a token certificate is initialized from the beginning with the fingerprint in the subject name, the fingerprint is submitted to a CA—separately or via a CSR (Certificate Signing Request) file. The client device 102 checks if its fingerprint is different from the one in the token's certificate. If the fingerprints are the same, the client station sends a signed message with its certificate to the SDS 112 directly. A TBS 104 is not required in this embodiment, and few if any changes are required in the SDS 112. If there are changes from the certificate—then the SDK executing on the client device refuses to execute any of the protocols to obtain secure data until it gets a new certificate. Further, in this embodiment, the CA performs the actions of determining if the token is bound and whether the fingerprints sufficiently match, and depending on this assessment, return a new certificate for the station. The CA also needs not be online.

Figure 6:
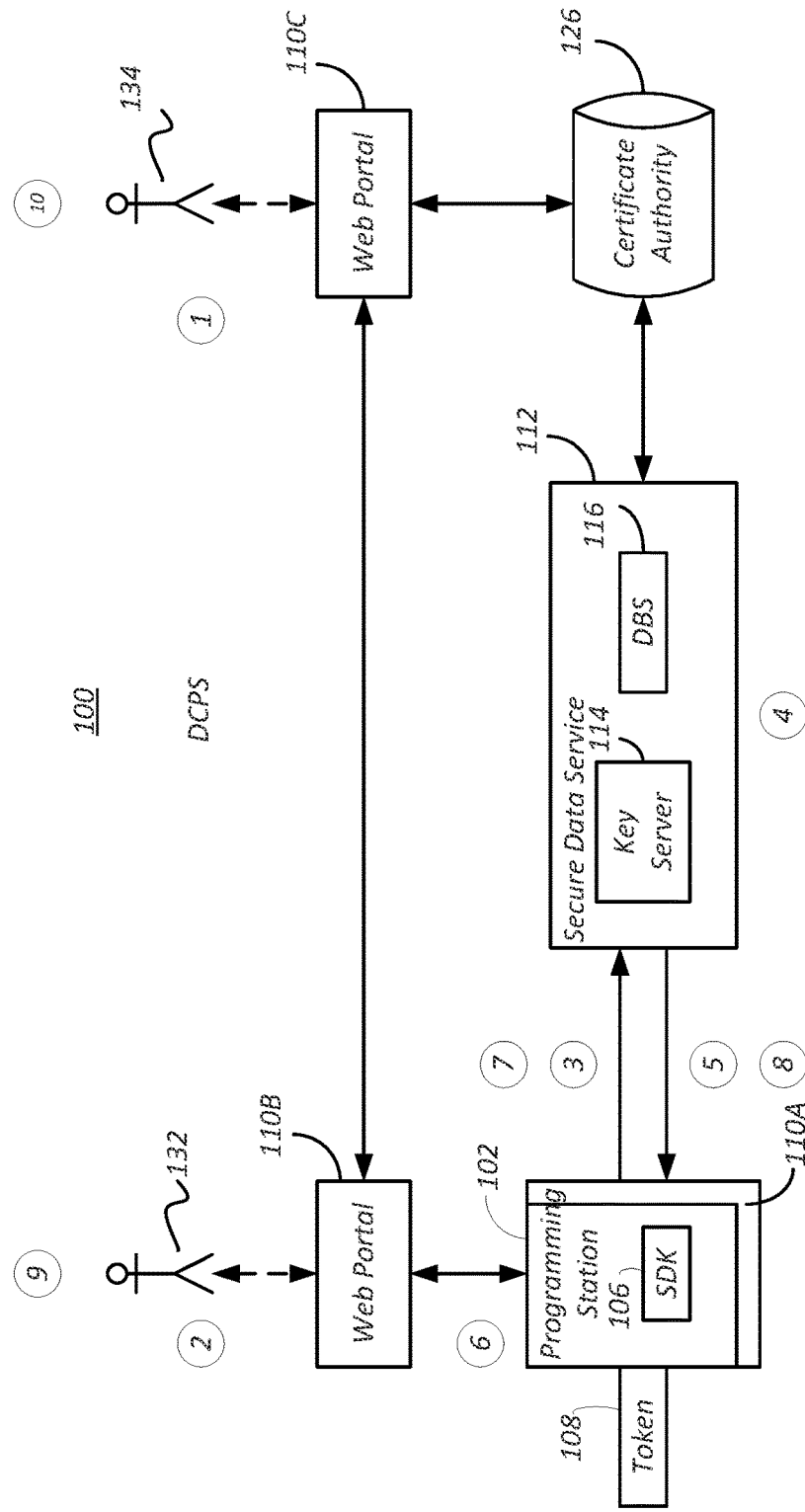
FIG. 6 is a diagram of still another embodiment of one embodiment of a token node locking system and method for using same.
Figure 7A:
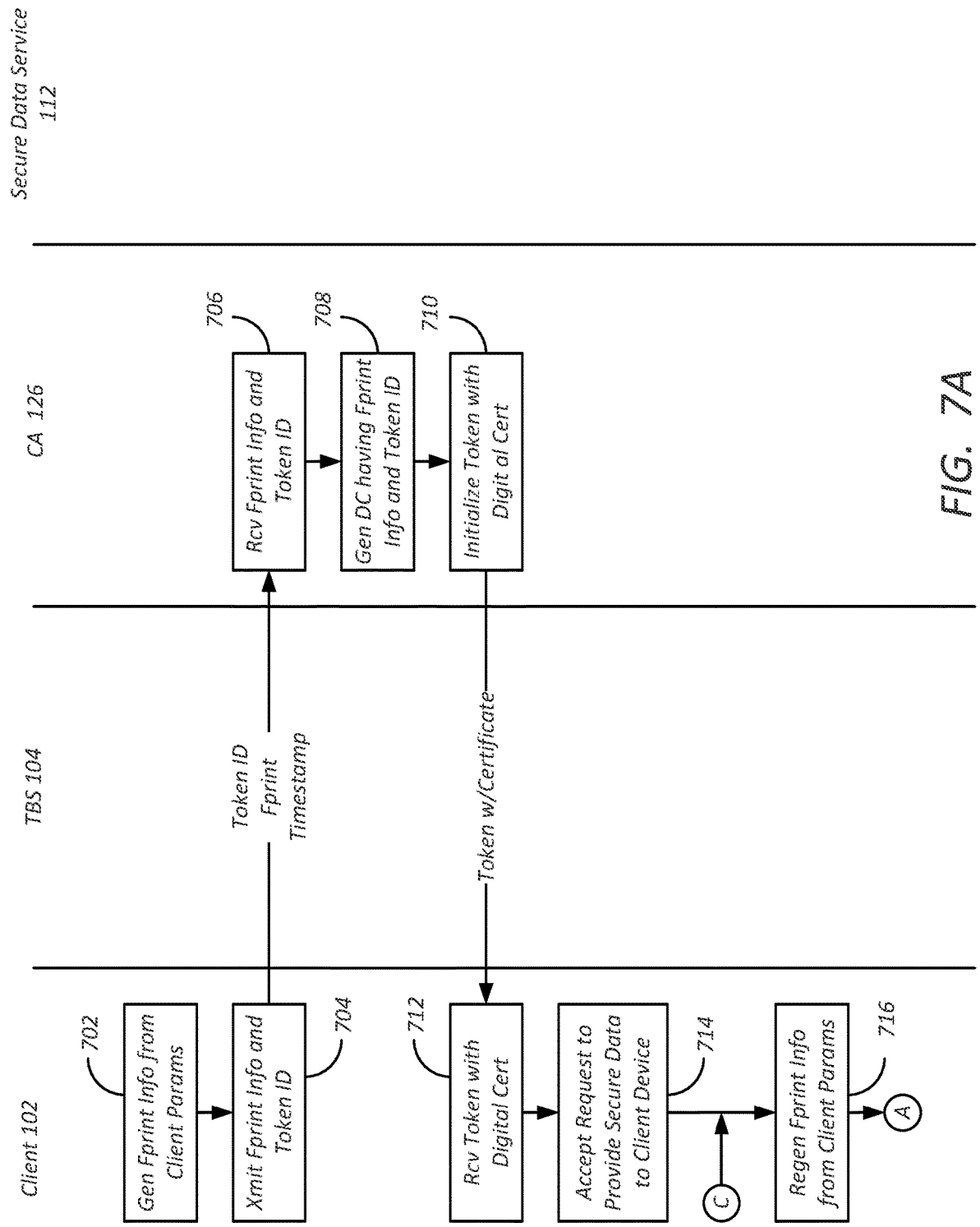
FIG. 7A-7C are diagrams presenting further details of the embodiment of operations used to establish and enforce node locking depicted in FIG. 6.
Figure 7B:
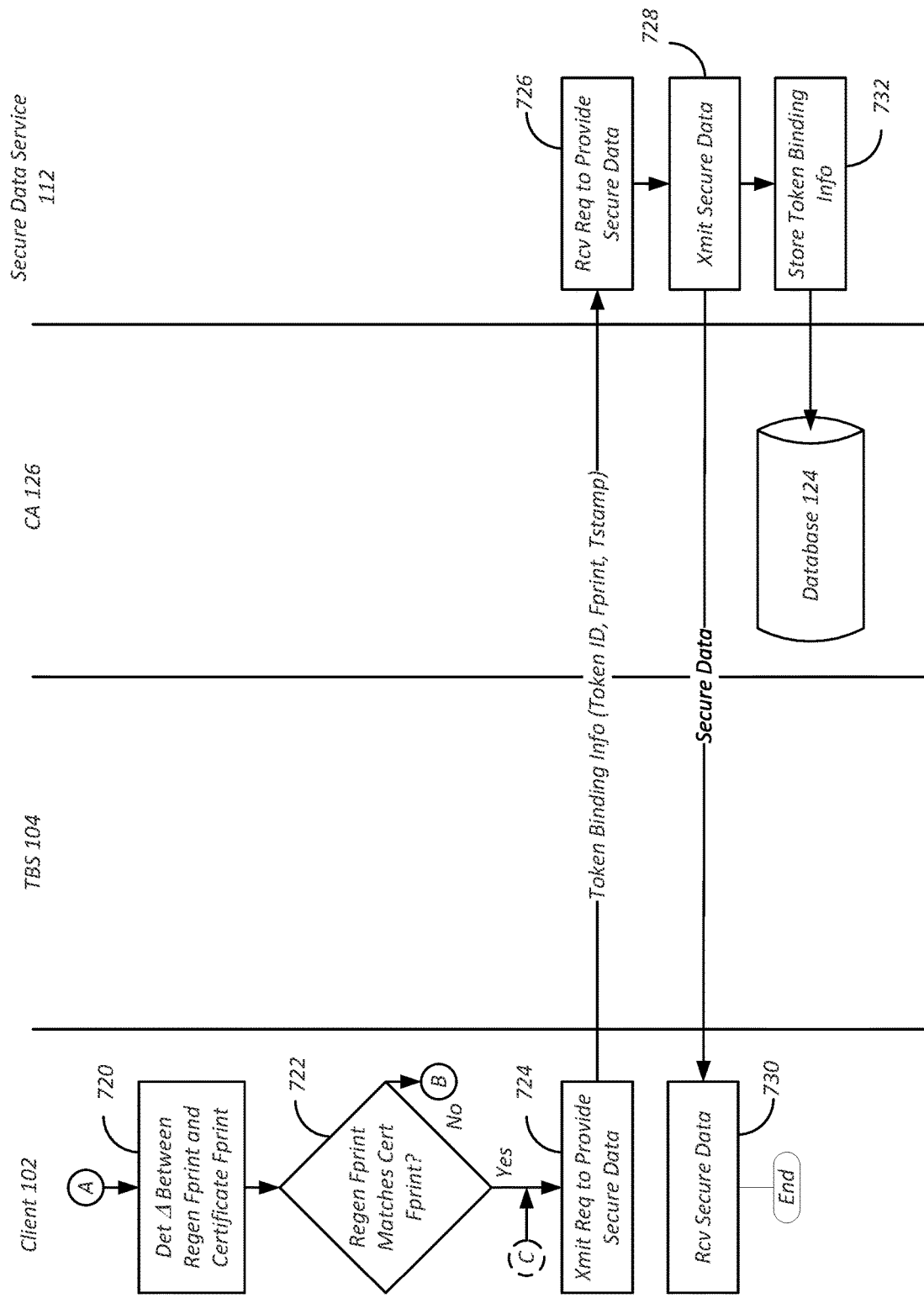
Figure 7C:
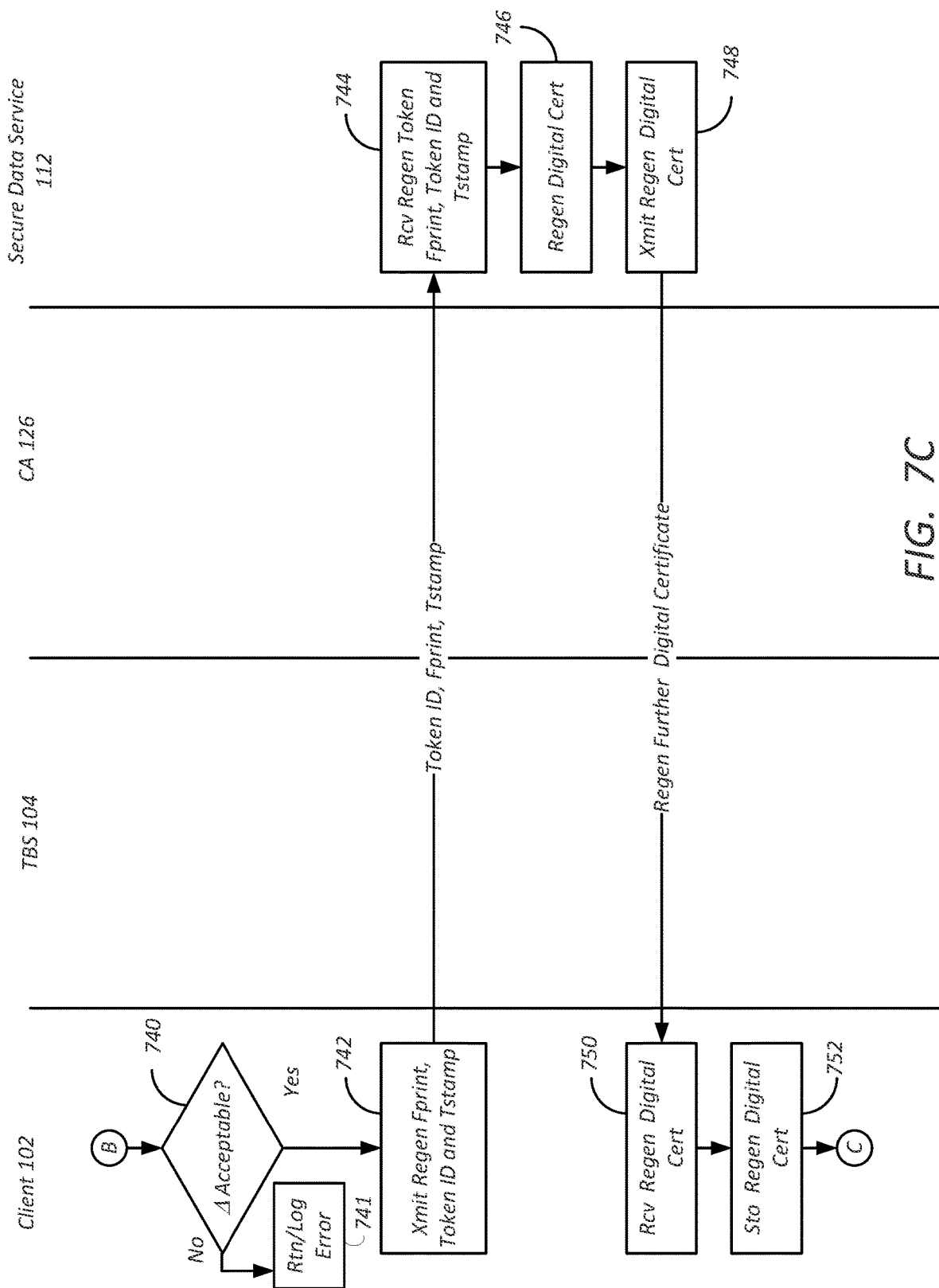

FIG. 6 is a diagram of still another embodiment of one embodiment of a token node locking system and method for using same. FIG. 7A-7C are diagrams presenting further details of the embodiment of operations used to establish and enforce node locking depicted in FIG. 6. FIG. 6 is annotated with numbers indicating a sequence of performed operations which are more fully described in FIGS. 7A-7C below. In steps 1 and 2, a manager of the factory administrator 134 of the DCPS 100 deploys or updates the TBS 104. The factory administrator 134 also deploys the SDK 106 to the client, and the client installs the SDK in the client device 102.

As shown in block 702, the SDK installed on the client device 102 generates fingerprint information from client device 102 parameters, as described above. The client device 102 gathers the token ID and the generated fingerprint information, and transmits the token ID, client device fingerprint data and timestamp to a Certificate Authority (CA) 126 in a certificate request, as shown in block 704 and step 3. The Certificate Authority 126 may be implemented in the DCPS 100 or by a third party CA. In block 706, the Certificate Authority 126 receives the certificate request having the token ID and client device fingerprint data, adds a timestamp (if a timestamp was not received with the certificate request), as shown in block 706. The Certificate Authority 126 then generates a digital certificate having the fingerprint information, token ID, and optionally, the timestamp, as shown in block 708, and initializes the token 108 with the digital certificate to the client device 102, as shown in block 710 and step 4.

Certificate Authority 122 may be issued a Subordinate CA certificate which chains up to a Root CA which may be operated by a separate organizational entity.

The Certificate Authority 122 provides the certificate to the client device 102, as shown in step 5 and block 712. In one embodiment, the token 108 is a hardware token that is initially disposed at the Certificate Authority 122. The token 108 is initialized with the digital certificate, and physically provisioned to the client device 102, for example, by way of the client device administrator 132. In other embodiments, the token is a hardware token that is physically disposed at the client device 102 or with the client device administrator 132, and the digital certificate is transmitted to the client device 102 and upon receipt, is stored in the token 108.

In block 714 and step 6, the client device 102 accepts a request to provide secure data to the client device 102. This accepted request invokes the SDK 106 which performs the operations executing on the client device 102 required to obtain the secure data. Turning to block 716, the client device regenerates the fingerprint data from client device parameters, using the same operations used to perform the operations of block 702. Processing is then routed to block 720, which determines one or more differences between the fingerprint data of the digital certificate (generated in block 702), and the regenerated fingerprint data (generated in block 716). If no changes to the client device 102 have been made, these fingerprints should match (e.g. be identical), thus indicating that the receipt of the secure data is authorized and should be permitted. If there acceptable changes to the client device 102 have been made (e.g. a new video card), this indicates that the secure data should be provided and that the latest client device fingerprint data should be used for future requests, thus triggering a request for a new certificate having the most recent fingerprint data. This may be implemented as described below:

In block 720, the client device 102 determines differences between the fingerprint data of the digital certificate and the regenerated client device fingerprint data. Block 722 determines if the fingerprint data of the digital certificate and the regenerated client device fingerprint data match (e.g. no differences). If it is determined that the client device fingerprint data from the digital certificate and the regenerated client device fingerprint data match, processing is routed to block 724, and the client device transmits a request for the secure data to the SDS 112, as shown in step 7. In one embodiment, the request comprises the digital certificate (token ID, the client device fingerprint data from the digital certificate) and a timestamp. In block 726, the SDS 112 uses the digital certificate to verify that the request was from a legitimate client device 102, and optionally from a known token ID, and subject to such verification, transmits the requested secure data to the client device 102, as shown in block 728 and step 8. As shown in block 730, the client device 120 receives the secure data. Since the SDK is trusted and would not have sent the request unless the fingerprint data of the certificate and the regenerated fingerprint data matched, the SDS 112 need only use the digital certificate to validate that the request came from the purported client device 102. However, the digital certificate or the information included with the digital certificate may be stored in the database 124. In one embodiment, the token 108 comprises a secure private key, and the request is signed by a private key corresponding to the digital certificate. The SDS 112 can then verify the signature of the request before acceptance.

If block 722 determines that the client device fingerprint data from the certificate does not match the regenerated client device fingerprint data, block 722 routes processing to block 740. Block 740 determines if the differences between the fingerprint data of the digital certificate and the regenerated fingerprint data are acceptable, in the same manner as earlier described. If the differences are not acceptable, processing is routed to block 741, which initiates error processing. If the differences are acceptable, the secure data is ultimately provided, and a request for an updated digital certificate (using the regenerated fingerprint data) may optionally be made either before providing the secure data to the client device 102 or after providing the secure data to the client device 102. The received info is also stored in database 124, as shown in block 732.

FIGS. 7A-7C illustrate the embodiment wherein a request for an updated digital certificate is made before the secure data is provided. Turning to block 742, a certificate request having the regenerated client device fingerprint data, the token ID and a timestamp is transmitted to the Certificate Authority (CA) 122. The CA 122 receives the certificate request and regenerates the digital certificate, as shown in block 746. The regenerated digital certificate includes the token ID and the regenerated (new) client device fingerprint data. In block 748, the further (regenerated) digital certificate is transmitted to the client device 102, where it is received and securely stored, as shown in blocks 750 and 752. Processing is thereafter routed to block 716, which repeats the process of regenerating the fingerprint data of the client device 102 and comparing that newly regenerated fingerprint data with the fingerprint data of the (regenerated) digital certificate received earlier. As indicated in FIG. 7B, if desired, processing may instead be routed to block 724 to bypass the further regeneration of the client device fingerprint data and comparison to the digital certificate, but this implementation is somewhat less secure as it will not catch changes occurring to the client device 102 since the earlier operation of block 716. As noted earlier, it is also for block 740 to route processing to block 724 before or in parallel with the operations of blocks 742-752 to request an updated digital certificate. This embodiment has the advantage in being more responsive to secure data requests, albeit with some loss in security due to the bypassing of the second performance of blocks 716, 720, and 722.

As before, it is noted that if the client device administrator 132 wishes to move the token to another client device 102, this can be accomplished by transmitting a request from the client device administrator 132 to the factory administrator 134 to unbind the token from the client device and rebind the token to a second client device having second client device fingerprint data as shown in step 9. The token 108 can then be bound to another client device 102 and another certificate obtained as described in steps 3-5 above, as shown in step 10.

Hardware Environment

Figure 8:
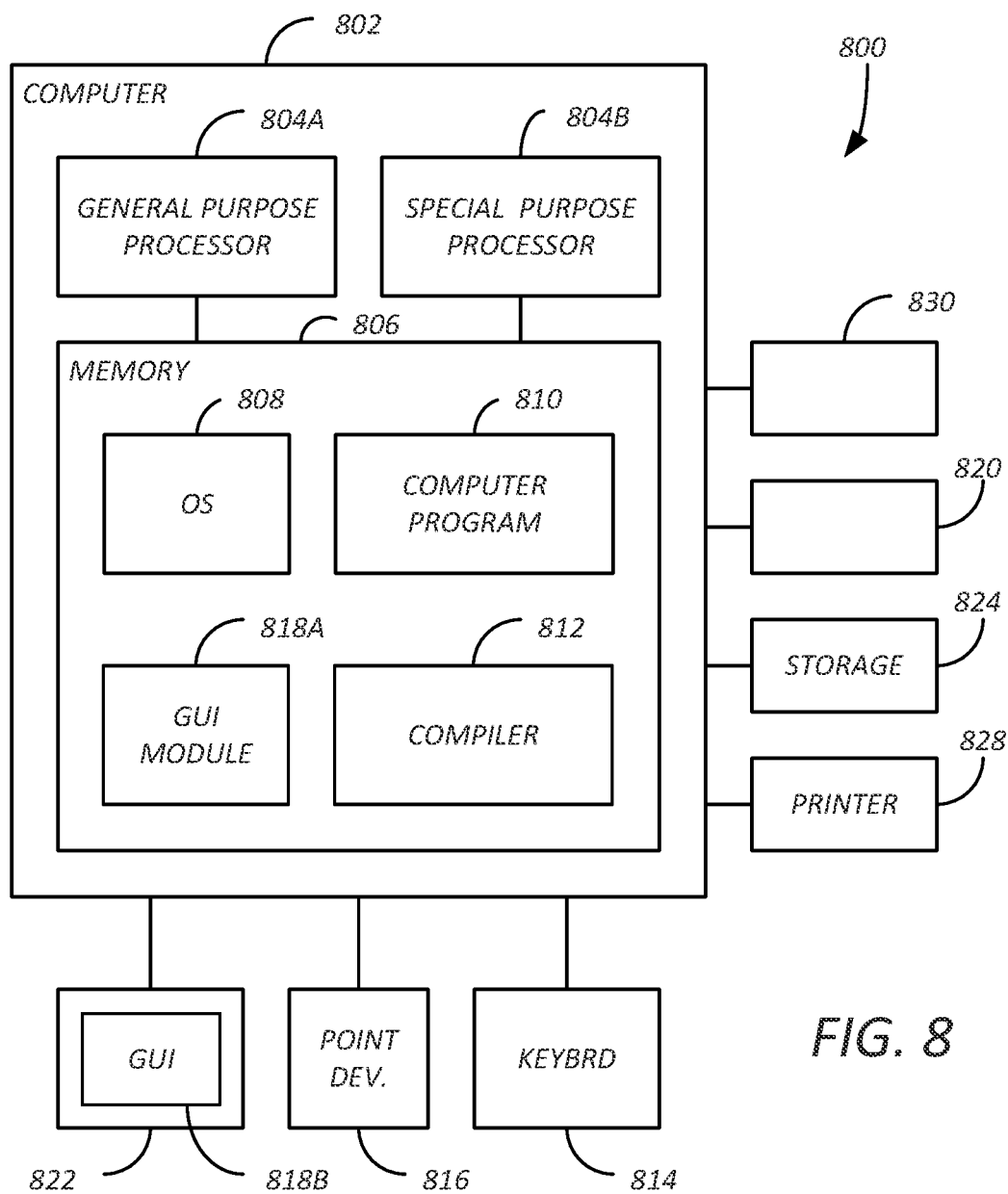
FIG. 8 illustrates an exemplary computer system that could be used to implement processing elements of the above disclosure.

FIG. 8 illustrates an exemplary computer system 800 that could be used to implement processing elements of the above disclosure, including the client device 102, SDS 112, Certificate Authority 122, or web portals 110A-110C. The computer 802 comprises a processor 804 and a memory, such as random access memory (RAM) 806. The computer 802 is operatively coupled to a display 822, which presents images such as windows to the user on a graphical user interface 818B. The computer 802 may be coupled to other devices, such as a keyboard 814, a mouse device 816, a printer 828, etc. Of course, those skilled in the art will recognize that any combination of the above components, or any number of different components, peripherals, and other devices, may be used with the computer 802.

Generally, the computer 802 operates under control of an operating system 808 stored in the memory 806, and interfaces with the user to accept inputs and commands and to present results through a graphical user interface (GUI) module 818A. Although the GUI module 818B is depicted as a separate module, the instructions performing the GUI functions can be resident or distributed in the operating system 808, the computer program 810, or implemented with special purpose memory and processors. The computer 802 also implements a compiler 812 which allows an application program 810 written in a programming language such as COBOL, C++, FORTRAN, or other language to be translated into processor 804 readable code. After completion, the application 810 accesses and manipulates data stored in the memory 806 of the computer 802 using the relationships and logic that was generated using the compiler 812. The computer 802 also optionally comprises an external communication device such as a modem, satellite link, Ethernet card, or other device for communicating with other computers.

In one embodiment, instructions implementing the operating system 808, the computer program 810, and the compiler 812 are tangibly embodied in a computer-readable medium, e.g., data storage device 820, which could include one or more fixed or removable data storage devices, such as a zip drive, floppy disc drive 824, hard drive, CD-ROM drive, tape drive, etc. Further, the operating system 808 and the computer program 810 are comprised of instructions which, when read and executed by the computer 802, causes the computer 802 to perform the operations herein described. Computer program 810 and/or operating instructions may also be tangibly embodied in memory 806 and/or data communications devices 830, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure.

The foregoing discloses an apparatus, method, and system for providing secure data to a client device having a token. In one embodiment, the method comprises (a) binding the token to the client device according to first token binding information comprising a first token identifier (ID), first client device fingerprint data, and a first timestamp, (b) receiving a request to provide secure data to the client device in a secure data service, (c) determining if the request to provide the secure data to the client device was received within an acceptable temporal range of the stored timestamp, and (d) providing the requested secure data according to the determination. In one embodiment, binding the token to the client device comprises: receiving the first token binding information from the client device in a token binding service; determining if the first token ID does not match a previously stored token ID; and if the first token ID does not match a previously stored token ID, associatively storing the first token ID with the first client device fingerprint data, and the first timestamp and determining if the request to provide the secure data to the client device was received within an acceptable temporal range of the stored timestamp comprises querying the token binding service for the first timestamp, and comparing the first timestamp with a further timestamp associated with a time that the request to provide secure data was received Implementations may include one or more of the following features:

Any of the methods described above, wherein: providing the requested secure data according to the determination includes: if the request to provide the secure data to the client device was not received within an acceptable temporal range of the first timestamp: receiving second token binding information from the client device in a token binding service, the second token binding information including a second token ID and second client device fingerprint data and a second timestamp; determining if the second token ID does not match a previously stored token ID; if the second token ID does not match a previously stored token ID, associatively storing the second token ID with the second client device fingerprint data, and the second timestamp; if the second token ID matches the first token ID: determining if the first client device fingerprint data matches the second client device fingerprint data: if the first client device fingerprint data matches the second client device fingerprint data, updating the stored timestamp to a current timestamp and repeating (b)-(d); if the first client device fingerprint data does not match the second client device fingerprint data, determining if differences between the first client device fingerprint data and the second client device fingerprint data are acceptable; if differences between the first client device fingerprint data and the second client device fingerprint data are acceptable: associatively storing the second token ID with the second client device fingerprint data, and the current timestamp, and repeating (b)-(d).

Any of the methods described above, wherein: if the differences between the first client device fingerprint data and the second client device fingerprint data are not acceptable, the method further includes: performing at least one of: returning an error to the client device; and logging the error to the secure data service.

Any of the methods described above, wherein: the first client device fingerprint data includes N first client device parameters; the second client device fingerprint data includes N second client device parameters; the not acceptable differences between first fingerprint data and the second client device fingerprint data includes at least one of an excessive number of changes between the N first client device parameters and the N second client device parameters over a time period; more than K changes between the N first client device parameters and the N second client device parameters; and the N first client device parameters are associated with a different token id than the second client device parameters.

Any of the methods described above, wherein: the first token binding information and the second token binding information is received via a secure session in a token binding service. The method wherein the first token ID and the first token binding information is associatively stored in storage of a PKI center.

Any of the methods described above, further including: receiving a request from an administrator of the client device to unbind the token from the client; and unbinding the token from the client device by disassociating the first client device fingerprint data from the token ID.

Any of the methods described above, wherein: the token includes a hardware token communicatively coupleable to the client device.

Another embodiment is evidenced by a an apparatus for providing secure data to a client device having a token, including: a processor; a memory, communicatively coupled to the processor, the memory storing processor instructions including processor instructions for performing the foregoing operations.

The foregoing discloses an apparatus, method and system for providing secure data to a client device having a token. One embodiment is evidenced by a method comprising: (a)

binding the token to the client device according to first token binding information comprising a first token identifier (ID), first client device fingerprint data, and a first timestamp, (b) receiving a request to provide secure data to the client device in a service, the request comprising the signed first token binding information and timestamp, (c) determining if the request to provide the secure data to the client device was received within an acceptable temporal range of the stored timestamp; and (d) providing the requested secure data according to the determination. In one embodiment, binding the token to the client device according to first token binding information comprising a first token (ID), first client device fingerprint data, and a first timestamp, comprises: receiving the first token binding information from the client device in a token binding service; determining if the first token ID does not match a previously stored token ID; if the first token ID does not match a previously stored token ID, associatively storing the first token ID with the first client device fingerprint data, and the first timestamp; signing the first token binding information; and returning the signed first token binding information to the client device. In a further embodiment providing the requested secure data according to the determination, comprises if the request to provide the secure data to the client device was received within an acceptable temporal range of the first timestamp, providing the requested secure data; if the request to provide the secure data to the client device was not received within an acceptable temporal range of the first timestamp: rejecting the request to provide the secure data, receiving second token binding information from the client device in a token binding service, the second token binding information comprising a second token ID and second client device fingerprint data and a second timestamp, and providing the requested secure data according to the received second token binding information.

Implementations may include one or more of the following features:

Any of the methods described above, wherein: providing the requested secure data according to the received second token binding information includes: determining if the second token ID does not match a previously stored token ID; if the second token ID does not match a previously stored token ID: associatively storing the second token ID with the second client device fingerprint data, and the second timestamp; signing the second token binding information; returning the signed second token binding information to the client device; if the second token ID matches the first token ID: determining if the first client device fingerprint data matches the second client device fingerprint data: if the first fingerprint data matches the second client device fingerprint data: updating the stored timestamp to a current timestamp; modifying the first token binding information by substituting the second time stamp for the first timestamp in the first token binding information; signing the modified first token binding information; returning the signed first token binding information to the client device; and repeating (b)-(d).

The foregoing methods may also include if the first client device fingerprint data does not match the second client device fingerprint data, determining if differences between the first client device fingerprint data and the second client device fingerprint data are acceptable; if differences between the first client device fingerprint data and the second client device fingerprint data are acceptable: associatively storing the second token ID with the second client device fingerprint data, and the current timestamp; signing the modified first token binding information; returning the signed first token binding information to the client device; and repeating (b)-(d); if the differences between the first client device fingerprint data and the second client device fingerprint data are not acceptable, performing at least one of: returning an error to the client device; and logging the error to the service.

Any of the methods described above, wherein: the first fingerprint data includes N first client device parameters; the second client device fingerprint data includes N second client device parameters; the not acceptable differences between first client device fingerprint data and the second client device fingerprint data includes at least one of an excessive number of changes between the N first client device parameters and the N second client device parameters over a time period; more than K changes between the N first client device parameters and the N second client device parameters; and the N first client device parameters are associated with a different token ID than the second client device parameters.

Any of the methods described above, wherein: the first token binding information and the second token binding information is received via a secure session in a token binding service.

Any of the methods described above, wherein: the first token ID and the first token binding information is associatively stored in storage of a secure data service.

Any of the methods described above, further including: receiving a request from an administrator of the client device to unbind the token from the client device and rebind the token to a second client device; and unbinding the token from the first client device by disassociating the first fingerprint data from the stored token ID.

Any of the methods described above, further including: generating a token report describing a history of token binding information of the token.

Any of the methods described above wherein the token includes a hardware token communicatively coupleable to the client device.

Another embodiment is evidenced by a having a processor communicatively coupled to a memory storing processor instructions comprising processor instructions for performing any of the foregoing operations.

The foregoing discloses an apparatus, method and system for receiving secure data in a client device. One embodiment is evidenced by a method including: (a) receiving a token having a token ID and a digital certificate generated by a certificate authority (CA) having client device fingerprint data generated from client device parameters, (b) accepting a request in the client device to provide secure data to the client device, (c) regenerating the client device fingerprint data from the client device parameters, (d) determining, in the client device, differences between the client device fingerprint data of the digital certificate from the regenerated client device fingerprint data, and (e) transmitting a request to a secure data service to provide secure data based upon the determination. In one embodiment, transmitting a request to a secure data service to provide secure data based upon the determination comprises: if the client device fingerprint data of the digital certificate matches the regenerated client device fingerprint data, transmitting the request to a secure data service to provide secure data to the secure data service; if the client device fingerprint data of the digital certificate does not match the regenerated client device fingerprint data, determining if differences between the client device fingerprint data of the digital certificate and the regenerated client device fingerprint data are acceptable; and if differences between the client device fingerprint data of the digital certificate and the regenerated client device fingerprint data are acceptable, transmitting the request to a secure data service to provide secure data to the secure data service and receiving the secure data.

Implementations may include one or more of the following features:

Any of the methods described above, wherein if the differences between the client device fingerprint data of the digital certificate and the regenerated client device fingerprint data are acceptable, the method further includes: transmitting the client device regenerated fingerprint data and token ID to the ca; receiving a further digital certificate generated by the CA having the client device regenerated fingerprint data; and storing the further digital certificate in the token.

Any of the methods described above, wherein if the differences between the client device fingerprint data of the digital certificate and the regenerated client device fingerprint data are not acceptable, the method further includes: returning an error to the client device; and logging the error to the secure data service.

Any of the methods described above, further including: compiling the logged error in a token report; and providing the token report to an administrator of the client device.

Any of the methods described above, wherein (b)-(e) are performed by a secure software development kit (SDK) executing on the client device.

Any of the methods described above, wherein receiving a token having a digital certificate generated by the CA having the client device fingerprint data includes: generating first client device fingerprint data from client device parameters; transmitting the first client device fingerprint data to a certificate authority (ca), the CA generating the digital certificate; and receiving the token.

Any of the methods described above, wherein the token includes a hardware token communicatively coupleable to the client device.

Any of the methods described above, further including: transmitting a request from an administrator of the client device to unbind the token from the client device and rebind the token to a second client device having second client device fingerprint data; and receiving a further digital certificate generated by the CA having the second client device fingerprint data.

Any of the methods described above, wherein: the token further includes a secure private key; the request is signed by a private key of the digital certificate; and the secure data is received from the secure data service only after verification of the signature of the request.

Another embodiment is evidenced by a processor and a memory, communicatively coupled to the processor, the memory storing processor instructions including processor instructions for performing the foregoing operations.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of receiving secure data in a client device, comprising:
   (a) receiving in the client device a token having both a token ID and a digital certificate generated by a certificate authority (CA), the certificate having client device fingerprint data generated from client device parameters;
   (b) accepting a request in the client device to provide secure data to the client device;
   (c) regenerating in the client device the client device fingerprint data from the client device parameters;
   (d) determining, in the client device, differences between the client device fingerprint data of the digital certificate and the regenerated client device fingerprint data;
   (e) selectively transmitting a request to a secure data service to provide secure data based upon the determination, comprising:
      if the client device fingerprint data of the digital certificate matches the regenerated client device fingerprint data, transmitting the request to a secure data service to provide secure data to the client device;
      if the client device fingerprint data of the digital certificate does not match the regenerated client device fingerprint data, determining if differences between the client device fingerprint data of the digital certificate and the regenerated client device fingerprint data are acceptable;
      if differences between the client device fingerprint data of the digital certificate and the regenerated client device fingerprint data are acceptable:
         transmitting the request to a secure data service to provide secure data to the client device;
         receiving the secure data;
         transmitting the client device regenerated fingerprint data and token ID to the CA;
         receiving a further digital certificate generated by the CA having the client device regenerated fingerprint data; and
         storing the further digital certificate in the token.

2. The method of claim 1, wherein if the differences between the client device fingerprint data of the digital certificate and the regenerated client device fingerprint data are not acceptable, the method further comprises:
   returning an error to the client device; and
   logging the error to the secure data service.

3. The method of claim 2, further comprising:
   compiling the logged error in a token report; and
   providing the token report to an administrator of the client device.

4. The method of claim 1, wherein (b)-(e) are performed by a secure software development kit (SDK) executing on the client device.

5. The method of claim 1, wherein receiving a token having a digital certificate generated by the CA having the client device fingerprint data comprises:
   generating first client device fingerprint data from client device parameters;
   transmitting the first client device fingerprint data to a certificate authority (CA), the CA generating the digital certificate; and
   receiving the token.

6. The method of claim 1, wherein the token comprises a hardware token communicatively coupleable to the client device.

7. The method of claim 1, further comprising:
   transmitting a request from an administrator of the client device to unbind the token from the client device and rebind the token to a second client device having second client device fingerprint data; and
   receiving a further digital certificate generated by the CA having the second client device fingerprint data.

8. The method of claim 1, wherein:
   the token further comprises a secure private key;

the request is signed by a private key of the digital certificate; and the secure data is received from the secure data service only after verification of the signature of the request.

9. A client device for receiving secure data, comprising:
a processor;
a memory, communicatively coupled to the processor, the memory storing processor instructions comprising processor instructions for:
(a) accepting a request in the client device to provide secure data to the client device, the client device having a communicatively coupled token having both a token ID and a digital certificate generated by a certificate authority (CA), the certificate having client device fingerprint data generated from client device parameters;
(b) regenerating the client device fingerprint data from the client device parameters;
(c) determining, in the client device, differences between the client device fingerprint data of the digital certificate from the regenerated client device fingerprint data;
(d) selectively transmitting a request to a secure data service to provide secure data based upon the determination, comprising:
  if the client device fingerprint data of the digital certificate matches the regenerated client device fingerprint data, transmitting the request to a secure data service to provide secure data to the client device;
  if the client device fingerprint data of the digital certificate does not match the regenerated client device fingerprint data, determining if differences between the client device fingerprint data of the digital certificate and the regenerated client device fingerprint data are acceptable;
  if differences between the client device fingerprint data of the digital certificate and the regenerated client device fingerprint data are acceptable:
    transmitting the request to a secure data service to provide secure data to the client device;
    receiving the secure data;
    transmitting the client device regenerated fingerprint data and token ID to the CA;
    receiving a further digital certificate generated by the CA having the client device regenerated fingerprint data; and
    storing the further digital certificate in the token.

10. The client device of claim 9, wherein the processor instructions further comprise processor instructions for returning an error to the client device and logging the error to the secure data service if the differences between the client device fingerprint data of the digital certificate and the regenerated client device fingerprint data are not acceptable.

11. The client device of claim 10, wherein the processor instructions further comprise processor instructions for:
compiling the logged error in a token report; and
providing the token report to an administrator of the client device.

12. The client device of claim 9, wherein (a)-(d) are performed by a secure software development kit (SDK) executing on the client device.

13. The client device of claim 9, wherein the processor instructions further comprise:

transmitting a request from an administrator of the client device to unbind the token from the client device and rebind the token to a second client device having second client device fingerprint data; and
receiving a further digital certificate generated by the CA having the second client device fingerprint data.

14. The client device of claim 9, wherein:
the token further comprises a secure private key;
the request is signed by a private key of the digital certificate; and
the secure data is received from the secure data service only after verification of the signature of the request.

15. A apparatus for receiving secure data, comprising:
means for accepting a request in a client device to provide secure data to the client device, the client device having a token having both a token ID and a digital certificate generated by a certificate authority (CA) having client device fingerprint data generated from client device parameters;
means for regenerating the client device fingerprint data from the client device parameters;
means for determining, in the client device, differences between the client device fingerprint data of the digital certificate from the regenerated client device fingerprint data;
means for selectively transmitting a request to a secure data service to provide secure data based upon the determination, comprising:
  means for transmitting the request to a secure data service to provide secure data to the client device if the client device fingerprint data of the digital certificate matches the regenerated client device fingerprint data;
  means for determining if differences between the client device fingerprint data of the digital certificate and the regenerated client device fingerprint data are acceptable if the client device fingerprint data of the digital certificate does not match the regenerated client device fingerprint data; and
  if differences between the client device fingerprint data of the digital certificate and the regenerated client device fingerprint data are acceptable, means for:
    transmitting the request to a secure data service to provide secure data to the client device;
    receiving the secure data;
    transmitting the client device regenerated fingerprint data and token ID to the CA;
    receiving a further digital certificate generated by the CA having the client device regenerated fingerprint data; and
    storing the further digital certificate in the token.

16. The apparatus of claim 15, further comprising processor instructions for returning an error to the client device; and logging the error to the secure data service if the differences between the client device fingerprint data of the digital certificate and the regenerated client device fingerprint data are not acceptable.

17. The apparatus of claim 16, wherein the processor instructions further comprise processor instructions for:
compiling the logged error in a token report; and
providing the token report to an administrator of the client device.

* * * * *